DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED FEBRUARY 23, 1971

884 O.G. 1325

T883,031

DIRECT POSITIVE SILVER HALIDE EMULSIONS SENSITIZED WITH CHLORANIL, 1,2-ORTHOQUINONE, OR POLYNUCLEAR HETEROCYCLIC COMPOUNDS

Paul B. Gilman, Jr., and Frederick J. Rauner, both of Kodak Park, Rochester, N.Y. 14650

Filed July 9, 1970, Ser. No. 53,629
Int. Cl. G03c *1/28*
U.S. Cl. 96—107
No Drawing. 25 Pages Specification

Direct positive photographic silver halide emulsions, such as those described in Berriman U.S. Pat. 3,367,778 issued Feb. 6, 1968 or Illingsworth U.S. Pat. 3,501,307 issued Mar. 17, 1970, are sensitized with chloranil, a 1,2-orthoquinone, an acridine, an acridone or a thiacridone. Preferred sensitizers include chloranil, 4-phenyl-1,2-orthoquinone, and compounds having one of the following formulas:

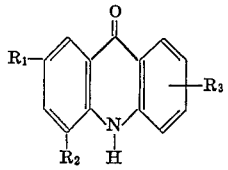

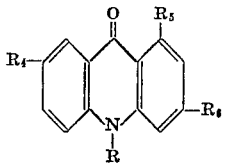

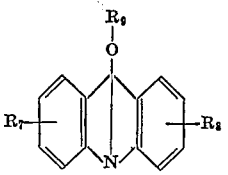

wherein R represents a hydrogen atom, a phenyl group or an aminophenyl group; $R_1$ represents an alkoxy group of a nitro group; $R_2$ represents a hydrogen atom or a phenoxy group; $R_3$ represents a hydrogen atom, a halogen atom or a nitro group; $R_4$ represents a hydrogen atom, a halogen atom, or an alkyl group; $R_5$ represents a hydrogen atom or an alkoxy group; $R_6$, $R_7$ and $R_8$ each represents a hydrogen atom, a halogen atom or an alkoxy group; and, $R_9$ represents alkyl or aryl. A typical direct positive silver halide emulsion contains 4-phenyl-1,2-orthoquinone or 7-tetramyl-3-chloro-thioacridine or 3,7 - dichlorothioacridone or 2-chloro-7-methoxy-5-phenoxyacridine as sensitizer and 5-m-nitrobenzylidenerhodanine as electron acceptor.